(12) United States Patent
Primmer

(10) Patent No.: US 6,484,941 B1
(45) Date of Patent: Nov. 26, 2002

(54) INFORMATION REGISTERING SYSTEM

(76) Inventor: John Anthony Primmer, 10 Osborne Street, Dapto New South Wales (AU), 2530

( * ) Notice: Subject to any disclaimer, the term of this patent is extended or adjusted under 35 U.S.C. 154(b) by 0 days.

(21) Appl. No.: 09/914,399

(22) PCT Filed: Mar. 30, 2000

(86) PCT No.: PCT/AU00/00261
§ 371 (c)(1),
(2), (4) Date: Aug. 21, 2001

(87) PCT Pub. No.: WO00/60549
PCT Pub. Date: Oct. 12, 2000

(30) Foreign Application Priority Data

Mar. 30, 1999 (AU) ................................................ PP 9489
Jun. 23, 1999 (AU) ................................................ PQ 1116

(51) Int. Cl.[7] ................................................ G06K 7/10
(52) U.S. Cl. ................................. 235/454; 235/462.32
(58) Field of Search .............................. 235/454, 462.32

(56) References Cited

U.S. PATENT DOCUMENTS 5,767,494 A * 6/1998 Matsueda et al. ........... 235/454

FOREIGN PATENT DOCUMENTS

JP 5182005 * 7/1993

* cited by examiner

Primary Examiner—Harold I. Pitts
(74) Attorney, Agent, or Firm—Jacobson and Johnson

(57) ABSTRACT

There is an information registration apparatus for registering patrons entering a club or other commercial use. The apparatus comprises a housing (1) with a top panel (3) and sign-in window (4). A form (14A) is displayed in the window (4) for handwritten entry of information by a patron. The information is then photographed from the underside by means of a camera (9) and image reversing reflective mirror (10) and stored or transmitted to a viewing station.

15 Claims, 2 Drawing Sheets

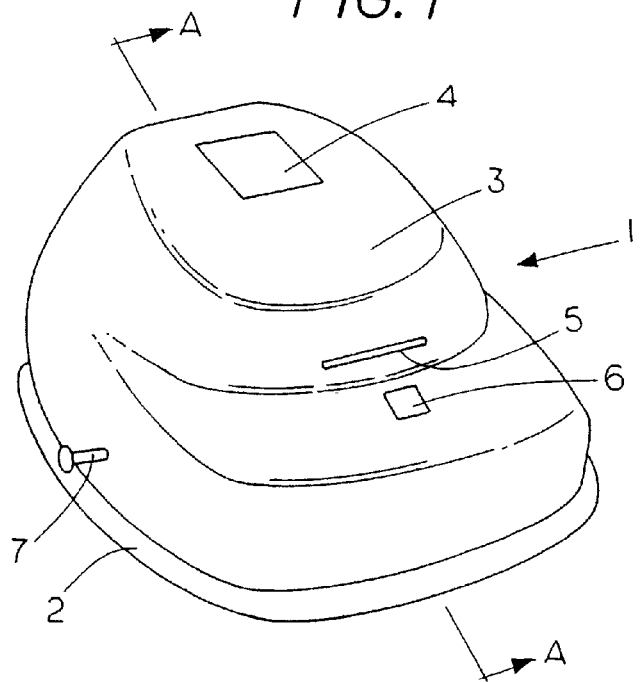
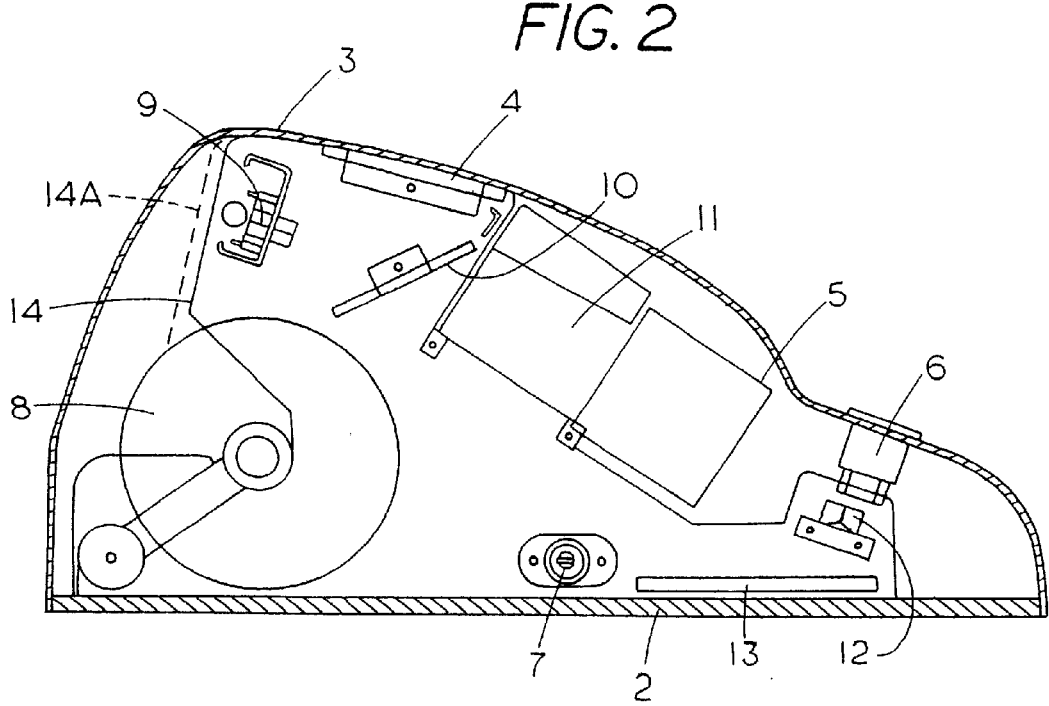

INFORMATION REGISTERING SYSTEM

FIELD OF THE INVENTION

This invention relates to information recording and processing equipment. More particularly, although not exclusively it discloses an improved apparatus for registering patrons entering a club or collecting and processing information entered by customers of commercial establishments.

BACKGROUND OF THE INVENTION

Current laws relating to licenced clubs require that the identities and addresses of members and visitors entering the premises be recorded. Such information must be kept by the clubs for a number of years. At present clubs use books of pre-printed forms on carbonless sheets or NRC paper. Each patron upon entering has to fill out a form which is then torn off and kept as proof of temporary membership. The duplicate remaining in the book becomes the club's record of the visit. Such books however are expensive and bulky to store. Further, there is no way for management to easily process or analyse the records to obtain marketing information on for example the frequency that certain persons use the club or the geographic areas most served by the club. While paperless registration systems have been proposed which to some extent address the above problems using such apparatus is often difficult and daunting for elderly persons.

SUMMARY OF THE INVENTION

It is therefore an object of this invention to ameliorate the aforementioned disadvantages and accordingly a registration apparatus for club or retail use is disclosed. said apparatus including a console with a window aperture for display of a pre-printed form for handwritten completion by a customer, means for obtaining information off the underside of said form, and means for paperless storage and/or transmission of said handwritten information to viewing stations.

Preferably said written information is stored on hard disk with an in house sequential number linked to the patron's issued entry docket.

It is further preferred that said written information be displayed on a remote monitor and/or a monitor at the back of said console for viewing by club personnel.

It is further preferred that said form or a copy thereof be returned to said customer after photographing original handwritten details by the camera capture unit.

BRIEF DESCRIPTION OF THE DRAWINGS

The currently preferred embodiment of this invention will now be described with reference to the attached representations in which:

FIG. 1 shows a front perspective view of a club registry apparatus according to this concept, FIG. 2 shows a schematic cross-sectional view along the lines A—A of FIG. 1, FIGS. 3 and 3A show the currently preferred form of sign-in docket for use with the apparatus of FIG. 1.

DETAILED DESCRIPTION OF THE PREFERRED EMBODIMENT

Figure 3:
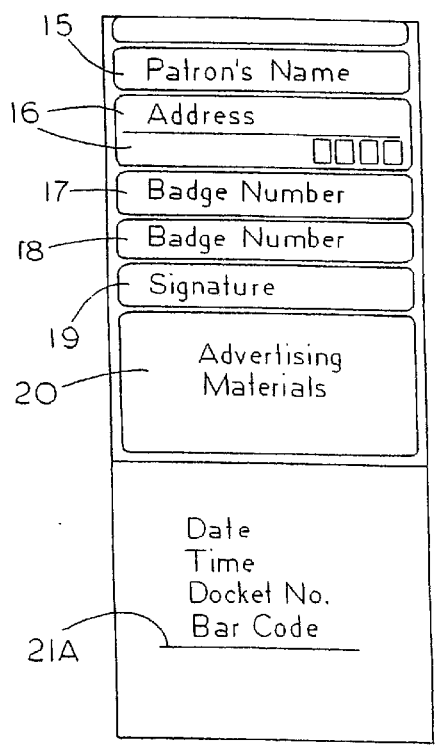

Referring first to FIG. 1 the apparatus housing 1 may be generally box-like in shape with a base 2 and a sloping top panel 3 for ease of writing. A rectangular window 4 is located in the top panel of the device which displays pre-printed sign-in dockets to be manually filled in by patrons entering the club premises. Also shown in FIG. 1 are a docket present slot 5, data entry button 6 and locks 7.

Referring now to the cross-sectional view of FIG. 2 the main internal hardware components preferably include a roll 8 of pre-printed entry dockets, camera 9, reflective mirror 10, docket presenter unit 11, light or tone. acknowledgement emitter 12, connector interface board 13 and support frame 14.

The frame 14 forms a path for a continuous strip 14A of blank pre-printed entry dockets drawn from the roll 8. This strip extends up from the roll, along the inside of the top panel 3, across the outside of the window 4 and into the presenter unit 11.

Figure 3A:
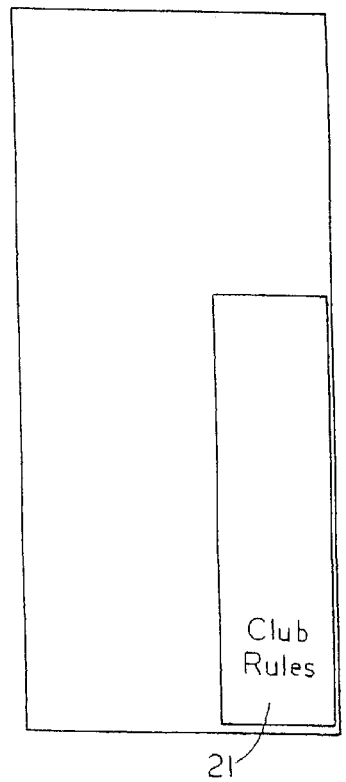

A non-limiting example of an entry docket is shown in FIGS. 3 and 3A. It may comprise areas for the handwritten entry of a patron's name 15, address 16, temporary or permanent member's badge number 17 and 18 and signature 19. A space 20 directly below may be reserved for advertising material. The reverse side of the docket as shown in FIG. 3A may include an area 21 for the club rules, age declaration and conditions of entry. A date, time, docket number and bar code may also be entered at the base 21A of the docket. With the current embodiment the dockets are preferably of thermal paper for reasons of economy and printing speed. As mentioned earlier the dockets are initially joined end-to-end and are loaded into the machine in the form of a continuous source roll 8.

Figure 4:
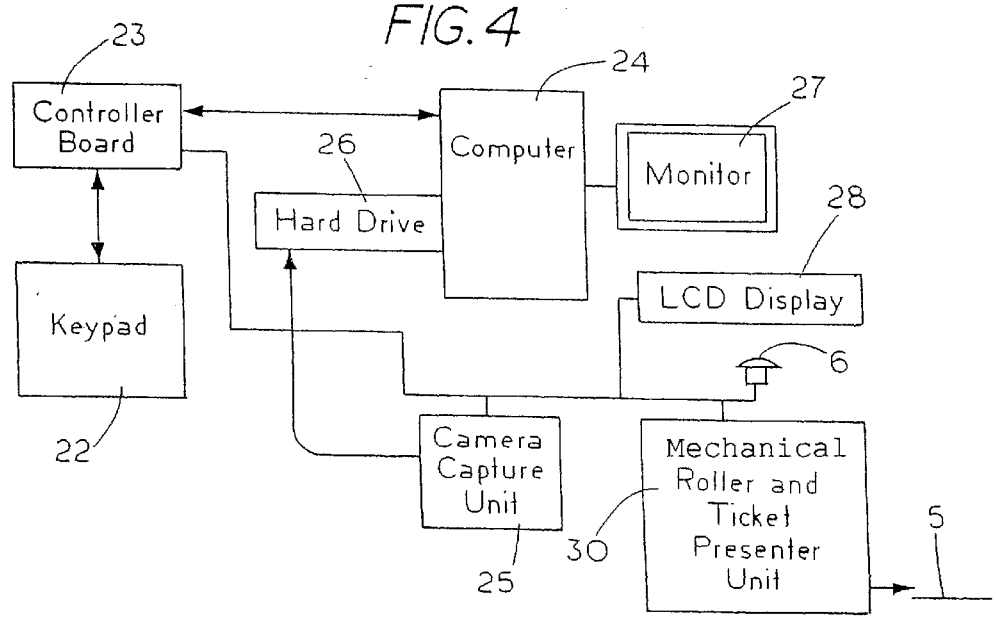
FIG. 4 shows the operational flow chart of the apparatus.

A microprocessor is preferably located in the base of the apparatus. As an alternative to local control via a keypad 22 this microprocessor as shown in FIG. 4 operates the general mechanics of the apparatus through the controller board 23. There is also an intel PC processor board which preferably manages the dataflow of the camera capture unit 25 and stores the electronic data on its hard drive 26 for convenient access by club management. It is also currently preferred that a DiskOnChip harddrive be used to house the operating system and the general software in addition to the storage hard drive. The remaining hardware items shown in FIG. 4 are identified as follows:

27—Monitor for reports to management and viewing of sign-in tickets

28—LCD display located prefereably on or adjacent machine for providing instructions to patrons 6—Visitor/Member button 30—Mechanical Roller and Ticket Presenter Unit It is further preferred that the general software for the apparatus use Visual Basic and the API's associated with all other devices. This provides the front end management of the data and facilitates manipulation of databases (particularly MS ACCESS) to give the option of developing Microsoft compatible management systems for larger clubs.

The currently preferred system architecture is PC driven using software on the PC which governs all system timing, communication, control. data/image acquisition and management; a single PC can control several presenter units; standard issue control boards come with the printer/presenter mechanism for low level control of printing and paper handling functions.

In use the apparatus is placed in the entry foyer of the club and a patron entering is instructed by an attendant or displayed information (e.g. the aforementioned LCD display 28) to fill in the required information on the sign-in docket appearing in the console window 4. After providing ID to substantiate the information entered the patron then pushes the visitor/member and data entry buttons. This first activates the image capture unit of the apparatus and then the docket presenter unit 11. The image capture unit preferably comprises a miniature single board camera 9 such as that manufactured by X Pose CCD Jaycar of Sydney NSW under model No. QC3462. The preferred arrangement for the camera is shown in FIG. 2. The handwritten information entered by the patron is photographed through the underside of the docket and glass window 4 using an image reversing reflective mirror 10. This image is then preferably sent to the aforementioned monitor 27 to be viewed and verified by club personnel as per legal requirements. Preferably a bit map digitised image is simultaneously stored on a Pentium computer included in the apparatus and backed up by an in house computer. Preferably the device also uses an optional character reader in the software to link the docket image to a pre-printed sequential number on said docket. The stored digitised image comprises the club's record of the patron's visit.

After the image capture is completed exit/feed rollers in the docket presenter unit 11 draw the completed docket through into said unit and the next blank docket in the strip 14A appears at the window 4 for a subsequent patron to fill in. A guillotine in the presenter unit 11 then severs the completed docket and presents it to the patron at the exit slot 5 to enable entry into the club. Preferably the completed docket is only left in the slot for a limited period of say 5 to 15 seconds after which, if not removed, it is withdrawn back into the apparatus for storage. With the current embodiment the presenter unit 11 is purchased from Star Micronics Pty. Ltd. of Wetherill Park New South Wales under model No. TUP 492. Other types of presenter units however may be used within the scope of this invention.

Although with the current embodiment the entry dockets are pre-printed the device is preferably capable of housing an internal printer for individual club requirements or other applications such as retail advertising.

It is envisaged that the device may also be used as a shopping centre promotional unit. In this case the camera capture unit would read a customers name, address and other handwritten marketing information from under the sign-in window 4. The software used with this application is preferably adapted to do the following:

link name, address and signature of customer to a pre-printed docket number, store a customer's name and address separately, store promotional information such as times the customer is in the shopping centre and postcode location for mail advertising, and link stored docket number to a promotional prize pool which may be administered by centre management.

Preferably the prize dockets as well as other bonus coupons can be prepared by the aforementioned internal thermal printer. No pre-printing is required as the printer produces all details including terms and conditions. The original completed and signed docket can also be deposited into a bin for major promotional prises.

In accordance with yet a further embodiment of the invention the device may be used as a self serve credit application unit. A roll of pre-printed application forms would be installed in the unit. The customer would fill in the required details on the exposed form in the window 4. On completion of the form the data entry button 6 is pushed by the customer and the details captured by the camera are sent by dedicated lines to the credit supplier. The original form is returned to the customer with a sequential number pre-printed on the form and a toll free telephone number which the customer can ring to enquire if approval for credit has been obtained.

The advantages provided by such credit application system include the following:

the customer is not required to give personal details to the salesperson, the salesperson is not taken off the floor for non-sales duties, the customer can obtain credit approval before selecting goods, any refusal of credit is kept confidential between the credit supplier and customer, and reduced credit can be offered confidentially to an applicant if credit level sought is not approved.

It will thus be appreciated that this invention at least in the form of the examples disclosed provides a novel and improved registry and handwritten data entry system for clubs, retail outlets and credit suppliers. Clearly however the embodiments described are only the currently preferred forms of this invention and a wide variety of modifications may be made which would be apparent to a person skilled in the art. For example the shape, configuration and layout of the console may be changed according to design preference. The invention is also not limited to the printer mechanism, hardware and software referred to in the description as these may be changed as required by different installations.

What is claimed is:

1. An information registration apparatus for club or other commercial use, said apparatus including means for display of a form for the entry of said information on a front side thereof by a user, means for capturing said information from the back side of said form and means for storage and/or transmission of said information to a viewing station.

2. The information registration apparatus as claimed in claim 1 wherein said means for capturing information includes a camera and a image reversing mirror located at the back side of said form.

3. The information registration apparatus as claimed in claim 2 wherein during the photographing operation a bit map digitised image of said information is stored on a Pentium computer.

4. The information registration apparatus as claimed in claim 3 wherein said apparatus further includes a software character reader to link said information to a pre-printed sequential number on said form.

5. The information registration apparatus as claimed in claim 4 wherein said form or a copy thereof is returned to said user after said information is photographed.

6. The information registration apparatus as claimed in claim 5 wherein said apparatus further includes a housing with a console and said means for display includes a window aperture in said console.

7. The information registration apparatus as claimed in claim 6 wherein said form is one of a plurality of identical forms connected end-to-end in a source roll located in said apparatus and said apparatus further includes a presenter unit which draws forms from said roll across said window aperture and into said presenter unit after said entry of information thereon.

8. The information registration apparatus as claimed in claim 7 wherein said presenter includes a guillotine for severing said form and means to subsequently present said form back to the user.

9. The information registration apparatus as claimed in claim 8 wherein said form is presented to the user for a limited time before being withdrawn back into said apparatus.

10. The information registration apparatus as claimed in claim 9 wherein a microprocessor in the base thereof operates the mechanics of said apparatus through a controller board.

11. The information registration apparatus as claimed in claim 10 wherein said apparatus includes a processor board to manage the data flow of said captured information.

12. The information registration apparatus as claimed in claim 11 wherein said form is printed on thermal or plain paper and includes space for advertisements.

13. The information registration apparatus as claimed in claim 12 wherein said apparatus includes an internal thermal or dot matrix printer for printing advertisements or other material onto said form prior to presentation back to the user.

14. The information registration apparatus as claimed in claim 13 wherein said apparatus is adapted for promotional use in a shopping centre.

15. The information registration apparatus as claimed in claim 13 wherein said apparatus is adapted for self service credit application and wherein after entry of personal credit information on said form said information is captured and transmitted to a credit supplier.

* * * * *